United States Patent [19]

Megahed et al.

[11] Patent Number: 4,835,077
[45] Date of Patent: May 30, 1989

[54] AGO CATHODE MATERIAL

[75] Inventors: El-Sayed A. Megahed; Alexander K. Fung, both of Madison, Wis.

[73] Assignee: Rayovac Corporation, Madison, Wis.

[21] Appl. No.: 149,642

[22] Filed: Jan. 28, 1988

Related U.S. Application Data

[63] Continuation-in-part of Ser. No. 826,118, Feb. 5, 1986, abandoned.

[51] Int. Cl.$^4$ .............................................. H07M 4/34
[52] U.S. Cl. ................................... 429/219; 429/206; 423/604; 252/182.1
[58] Field of Search ............... 429/206, 219; 423/604; 252/182.1

[56] References Cited

U.S. PATENT DOCUMENTS 4,068,049  1/1978  Narusishi et al. ................... 429/219
4,078,127  3/1978  Megahed et al. ................... 429/206

FOREIGN PATENT DOCUMENTS 56-9222  1/1981  Japan ................................... 423/604

Primary Examiner—Stephen J. Kalafut
Attorney, Agent, or Firm—Kenyon & Kenyon

[57] ABSTRACT

Divalent silver oxide (AgO) cathode materials discharge at virtually single voltages, even at low drains. The AgO cathode materials, which comprise AgO, $Ag_2O$ and silver plumbates ($Ag_5PbO_6$ and $Ag_2PbO_2$), are the reaction products of minor amount of PbS and major amounts of AgO in hot aqueous sodium hydroxide. Cells incorporating such cathodic materials are thermally stable and exhibit low impedance.

18 Claims, 3 Drawing Sheets

AGO CATHODE MATERIAL

This application is a Continuation-in-Part of Ser. No. 826,118, filed Feb. 5, 1986, now abandoned.

FIELD OF INVENTION

This invention relates to cathodes of AgO for use in alkaline electrochemical cells, and more particularly relates to preparation and use of a novel AgO cathode material which when placed in alkaline electrochemical cells allows for cells having highly stable cathodes, much lower cell impedance and a single-voltage discharge under even low drains.

BACKGROUND OF INVENTION

It is well recognized in the art of electrochemical cells to provide a cell having a cathode of divalent silver oxide (AgO). This material provides, when associated with a suitable anode, e.g., zinc and a suitable electrolye, e.g., aqueous potassium hydroxide containing or saturated with zinc oxide, a cell of relatively high coulometric capacity per unit volume and of relatively high voltage.

The art is also aware that AgO has certain deficiencies as a cathode material. Specifically, in storage and between periods of use, AgO in contact wih cell electrolyte tends to decompose releasing gaseous oxygen and thus simultaneously increases pressure inside a sealed cell and reduces coulometric capacity. Furthermore, AgO provides dual voltage when electrolytically discharged. Initially upon discharge, AgO provides a voltage characteristic of the AgO →Ag$_2$O reaction and thereafter provides a voltage characteristic of the Ag$_2$O →Ag reaction. Still further, a cell employing AgO as a cathode may be characterized by increasing internal resistance which increases with time at room and elevated temperatures. Heretofore, numerous disclosures have been made which teach solutions to one or more of these problems, including:

| Country | Patent No. | Inventor (or Assignee) | Issue Date |
|---|---|---|---|
| Japan | 78/63543 | Murakami et al. | June 7, 1978 |
| U.S. | 3,017,448 | Cahan | January 1, 1962 |
| U.S. | 4,078,127 | Megahed et al. | March 7, 1978 |
| U.S. | 4,015,056 | Megahed et al. | March 29, 1979 |

To the extent it is understood from the abstract printed in English in Chemical Abstracts, the Murakami et al. disclosure appears to be similar to that of Cohan in U.S. Pat. No. 3,017,448. Both Cahan and Murakami et al. disclose that the gassing of AgO can be inhib ed by treatment of AgO with lead or a lead comį onent. Cahan disclosed Pb$^o$, PbO, Pb(OH)$_2$ or sodium plumbate as materials suitable for addition to an AgO electrode or treatment of an AgO electrode, while Murakami et al. teaches treating AgO with an alkaline solution containing a plumbate ion. Cahan specifically discloses that use of his treatment enhances or extends the duration of cell discharge at a voltage characteristic of the AgO →Ag$_2$O reaction. Thus, even though Cahan tended to solve the gassing problem associated with use of AgO cathodes, the solution exacerbated the aforestated dual voltage problem.

Mehahed et al., in U.S. Pat. No. 4,078,127 ("Megahed I"), claimed the use of metallic sulfide additives, included by dry mixing metallic sulfides and AgO, in AgO-containing cathodes. Specifically, Megahed I teaches that sulfides of cadmium, calcium, mercury, tin, tungsten, (or mixtures thereof) included in the cathode mixture, will inhibit AgO gassing. Megahed I disclosed that some of the sulfides, when included in the cathode mix, lowered cell impedance both initially and during discharge. Further, Megahed I disclosed that cadmium sulfide was the most effective sulfide additive under the conditions of mix preparation prescribed therein. However, under the conditions so prescribed, Megahed I disclosed that AgO cathode mixes which contained up to 3% lead sulfide were not found to be beneficial to the stability of such AgO electrochemical cells, since such cathode mixes did not prevent gassing and were detrimental to the impedance of cells upon high temperature storage. Moreover, Megahed I, while stating "cadmium sulfide was found to improve the voltage stability of cells...", does not disclose, much less claim, that cadmium sulfide additives yield cells with a single voltage discharges under low drain conditions.

Megahed et al., in U.S. Pat. No. 4,015,056 ("Megahed II"), discloses and claims a two-step process which yields an AgO cathodic material having a single voltage discharge. In the first step, an AgO pellet is treated with a mild reducing agent, such as methanol to form Ag$_2$O around the pellet. Then, after consolidation, a strong reducing agent, such as hydrazine, is applied to form a silver layer on the pellet surface. Cells containing such cathodes display the OCV and CCV values typical of the Ag$_2$O-Zn electrochemical cell system. However, such cells developed with time a relatively high impedance.

In addition to the aforelisted prior art, other prior art exists relative to the properties, formation and stability of AgO. "Electrode Phenomena of Silver-Silver Oxide System in Alkaline Batteries" by Shiro Yoshizawa and Zenichro Takehara published in the Journal of the Electrochemical Society of Japan, Volume 31, Number 3. pages 91–04 (1963) reports the effect of various metallic additives on the oxidation of silver electrodes. Among the additivies studied by the Japanese, was gold which was reported to increase the rate of formation of divalent silver oxide during the electrochemical formation of silver electrodes, i.e., oxidation of silver. Another article entitled "The Electric Resistivity of Silver Oxide" by Aladar Tvarusko published in the Journal of the Electrochemical Society, Volume 115, Number 11, pages 1105–1110 (November, 1968) reported on various metallic additives and their effect on the electric resistivity of divalent silver oxide. The article reports that mercury and lead added during the preparation of silver oxide decreased the electric resistivity of silver oxide. The article further confirms the disclosure of Cahan in U.S. Pat. No. 3,017,448 that the use of lead in an AgO cathode extends the time during dicharge at which the cathode exhibits voltaic properties characteristic of the AgO→Ag$_2$O reaction.

The patent literature also contains publications disclosing additives for alkaline batteries employing silver positive electrodes. U.S. Pat. No. 3,617,384 issued to Kamai et al. on Nov. 1, 1971 discloses a secondary zinc alkaline cell in which gold or silver, alloys thereof, oxides and hydroxides may be added to the zinc anode. U.S. Pat. No. 3,650,832 issued to Aladar Tvarusko on Mar. 21, 1972 discloses certain additives for divalent silver oxide selected from mercury, selenium, tellurium and combinations of mercury with tin or lead. Japanese Patent Application No. 48-1929 which was open to public inspection on Jan. 11, 1973 discloses adding gold hydroxide into the electrolyte of an alkaline silver oxide cell. U.S. Pat. No. 3,853,623 issued on Dec. 10, 1974 to Stuart M. Davis discloses gold ion additive for divalent silver oxide. U.S. Pat. No. 3,936,026 issued on Jan. 2, 1976 to Paul L. Howard and U.K. specification No. 1,474,895 disclose a cathode material which is a mixture of divalent silver oxide and sulfur and a cathode material which is a mixture of divalent silver oxide and silver sulfide. Great Britain Pat. No. 1,065,059 published Apr. 12, 1967 discloses the addition of cadmium oxide, magnesium oxide, or aluminum oxide to a silver electrode.

Even in view of the extensive developments in this field, there is a need for a more effective and more easily controllable means for providing a highly stable, single voltage-producing, low impedance-producing AgO cathode material. Therefore, it is an object of the present invention to provide for an AgO cathode material having a single voltage discharge at even low drains.

It is another object of this invention to provide for an AgO cathode material with low impedance.

Yet another object of this invention is to provide for an AgO cathode material which exhibits very little gassing after being placed in an electrochemical cell.

Another object of this invention is to provide a method of producing an AgO cathodic material which, after being placed in an electrochemical cell, provides for a cell which is thermally stable, has low impedance and displays a single voltage discharge at even low drains.

These and other subsidiary objectives which will appear are achieved by the practice of the present invention.

SUMMARY OF THE INVENTION

The present invention provides for a stable AgO-containing cathode material with low impedance, which under even low drains, discharges at a single potential and the process for making such cathodic material. The cathodic material disclosed by the present invention is made by reacting in a hot aqueous alkaline medium powdered divalent silver oxide with powdered lead sulfide, which is approximately 5% to 17% by weight lead sulfide, and recovering the solid reaction product from the aqueous medium. The present invention also provides for cathodes consisting essentially of the disclosed novel cathodic material. As used in the electrochemical cells, the recovered reaction product, i.e., the cathodic material, may then be dry mixed with known additives and lubricants, such as powdered polytetrafluoroethylene powder, and compressed to form a cathode body, i.e., a pellet f r use in a button-type cell. Additionally powdered c dmium sulfide, which is known to reduce gassing, is u ally added to the cathodic material, either to the reactants in the presence of the hot alkaline or as a dry additive to the recovered reaction product.

DESCRIPTION OF THE INVENTION

While the present invention is applicable to all types of silver oxide cathodes used in alkaline electrochemical cells and such cells themselves, the invention will be described in terms of a silver oxide/zinc button cell.

In general, the AgO cathodic material disclosed by the present invention has very low impedance vis-a-vis known AgO cathodic material. Moreover, when the AgO cathodic material is incorporated into alkaline electrochemical cells, such cells exhibit a single voltage discharge under even low drains and exhibit very little gassing of the AgO cathodic material.

The process for the production of the novel cathodic material comprises reacting powdered divalent silver oxide with between five (5) and seventeen (17) percent by weight of finely powdered lead sulfide in a hot aqueous alkaline solution, i.e., between 40° C. and the boiling point of the alkaline solution for several hours. Then the reaction product, a dark powder distinct from the two reactants and recovered from the aqueous medium usually by decantation followed by washing with distilled water and vacuum drying, consists of divalent silver oxide (AgO), monovalent silver oxide ($Ag_2O$), silver plumbates (hereinafter defined as $Ag_5Pb_2O_6$ and $Ag_2PbO_2$) and possibly trace amounts of residual unreacted lead sulfide (PbS).

The reaction product can be compressed to form a cathode body, e.g., a tablet for use in button-type cells. Prior to the formation of the cathode, the reaction product may be mixed with cadmium sulfide (as taught in Megahed I) to further reduce AgO gassing and a lubricating amount of polytetrafluoroethylene powder (typically 1% by weight) to aid in the compression process. The cathode, with or without cadmium sulfide, exhibits a single potential characteristic of the $Ag_2O \rightarrow Ag$ reaction and a coulometric capacity proportional to the amount of divalent silver oxide. Among the many advantages of the cathodic material produced by the process of the present invention are high stability evidenced by a low gassing rate of less than 10 microliters/gram/hour when tested at 74° C. in 40% KOH/1.0% ZnO versus a gassing rate for divalent silver oxide alone of more than 100 microliters/gram/hour under the same conditions. Cells containing the cathodic material of the present invention and containing zinc anodes and aqueous KOH/ZnO electrolytes, or other electrolytes having a substantial content of alkali metal hydroxide, exhibit little or no cell expansion. The cathodic material produced by the process of the present invention, compared to other AgO-containing materials, is less dusty, flows better on pelleting presses and provides stronger pellets. Fresh and aged cells with a zinc anode, potassium hydroxide or another alkaline electrolyte, and a cathode made with material produced by the process of the present invention have low impedance both initially and throughout discharge.

Figure 1:
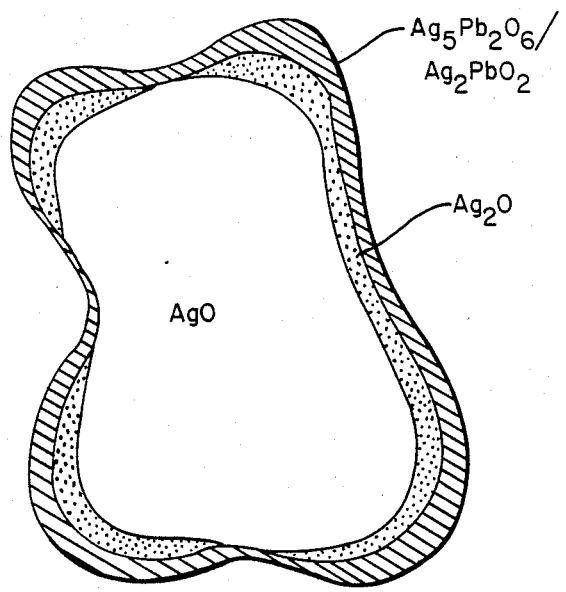
FIG. 1 is a schematic diagram of a particle of cathodic material of the present invention.

While the reaction product of the AgO and PbS is not fully understood, it is hypothesized that reaction product consists of particles of AgO coated with a layer of $Ag_2O$ and somewhat thinner outer layer of conductive silver plumbate as schematically depicted in FIG. 1. Conversely, the prior art AgO/silver plumbate material of Cahan is believed to consist of AgO particles coated only with a thin layer of silver plumbate material, as depicted in FIG. 1. These hypotheses are supported by the chemical and x-ray analyses of the recovered reaction products.

An X-ray diffraction analysis of the recovered reaction product of AgO and 7% by weight PbS in hot sodium hydroxide indicated that the novel cathodic material of this invention consists of relatively large amounts of AgO vis-a-vis $Ag_2O$ and a relatively large amount of $Ag_5Pb_2O_6$ vis-a-vis $Ag_2PbO_2$. And while an x-ray diffraction analysis of the product disclosed by Cahan (i.e., AgO and 7% by weight PbO) indicates the presence of the same four compounds, the proportions of these compounds are qualitatively different. The cathodic material disclosed by Cahan contains a very large amount of AgO, but only a trace of $Ag_2O$; moreover, the proportion of the silver plumbates in the Cahan material are approximately the same. Quantitatively, chemical analysis shows that approximately 63% of the AgO/7% by weight PbS reaction product is AgO, while almost 89% of the Cahan (AgO/7% PbO) product is AgO.

The difference in the ratio of AgO: $Ag_2O$ between the reaction product of the present invention and the cathode material disclosed in Cahan can be explained by the following sets of hypothosized reactions. For example, when PbO is the lead containing starting material, as in Cahan, the reactions can be summarized as follows:

$$2\ AgO + PbO \rightarrow Ag_2O + PbO_2 \tag{1}$$

$$Ag_2O + PbO \rightarrow Ag_2PbO_2 \tag{2}$$

$$5\ AgO + 3\ PbO \rightarrow Ag_5Pb_2O_6 + PbO_2 \tag{3}$$

$$2\ AgO + 2\ PbO \rightarrow Ag_2PbO_2 + PbO_2 \tag{4}$$

Therefore, although reactions between AgO and PbO which form silver plumbates may form $Ag_2O$ as an intermediate product, very little or no $Ag_2O$ will be present in the final reaction product. This is especially true in hot sodium hydroxide solutions since lead oxide (PbO) is extremely soluble (hence, reactive) in such solutions. It is hypothesized that the absence of $Ag_2O$ from the plumbate coated AgO particles explains the two-step discharge observed by Cahan.

In the reaction of AgO and PbS, the sodium hydroxide becomes a reactant. Consequently, the possible reaction between AgO and PbS in hot sodium hydroxide is:

$$PbS + 8\ AgO + 2\ NaOH \rightarrow 4\ Ag_2O + PbO + Na_2SO_4 + H_2O \tag{5}$$

When PbO is formd, an aforementioned reaction takes place rapidly:

$$2\ AgO + Pbo \rightarrow Ag_2O + PbO_2 \tag{1}$$

But since there is never enough lead oxide to react all of the monovalent silver oxide, the net overall reactions for the production of silver plumbates, i.e., when (5) is combined with (3) and (4), show that $Ag_2O$ will be in the final reaction product:

$$3\ PbS + 27\ AgO + 6\ NaOH \rightarrow Ag_2PbO_2 + Ag_5Pb_2O_6 + 10\ Ag_2O + 3\ Na_2SO_4 + 3\ H_2O \tag{6}$$

$$2\ PbS + 19\ AgO + 4\ NaOH \rightarrow Ag_5Pb_2O_6 + 7\ Ag_2O + 2\ Na_2SO_4 + 2\ H_2O \tag{7}$$

Consequently, the important difference between Applicants' invention and the Cahan disclosure is that along with the formation of plumbate, monovalent silver oxide remains as a product of the reaction. It is this presence of $Ag_2O$ which explains the single step discharge observed with Applicants' reaction product.

While there is no direct evidence that chemical reactions (6) and (7) are necessarily correct, there is supporting evidence that the hypothesized approach is correct. After the reaction (using 8% by PbS by weight) is completed, chemical analyses show a loss of sodium hydroxide while total sulfur analyses show a sulfur compound in the spend reaction solution, which qualitatively has been identified as a sulfate. Additionally, calculations from the predicted reaction equations and chemical analysis of the reaction product agree quite well:

|  | Based on Reaction | Based on Chemical Analysis |
|---|---|---|
| % AgO | 64.6 | 63.6 |
| % $Ag_2O$ | 20.8 | 20.3 |
| % plumbates ($Ag_5Pb_2O_6$/$Ag_2PbO_2$) | 12.1 | 11.9 |
| Unreacted insolubles | 2.4 | 2.4 |

The insolubility of PbS and AgO in hot sodium hydroxide solution means that for the reaction to take place, the PbS and AgO particles must be in contact. This suggests that the reactor design and the stirrer design and the velocity of stirring, or other means of agitation, could be critical parameter impacting upon the properties of the novel reactor product. Mreover, the need for physical contact for the reaction to take place means that it is outside the contemplation and scope of the invention to include instances in which a dry blend of AgO and PbS is introduced into an aqueous alkali environment and permitted to react at low temperatures over long periods of time. Also outside of the scope of the present invention is the formation cathode bodies from dry blends of AgO and lead sulfide, the construction of alkaline electrochemical cells with these dry-blend cathode bodies, and then heating such cells to high temperature, e.g., 70° to 80° C., since the minimum time to form the desired reaction product in situ, i.e., in an assembled alkaline electrochemical cells, would be infinite.

While it is not well understood, applicants believe that the increased amount of $Ag_2O$ and silver plumbates surrounding the AgO particles results in the relatively constant discharge at the level of monovalent silver oxide, Applicants further hypothesized that it is the lack of $Ag_2O$ in particles of the silver plumbate coated AgO the cathode material which caused the Cahan material to have a significant two-step discharge while the significant two step discharge seen in the cathode material of Megahed I results from the lack of the formation of a significant silver plumbate layer. The Applicants further believe that the reduction in cell impedance is due to the presence of a conductive outer layer of silver plumbate.

As those of ordinary skill in the art will appreciate, both pellets and consolidated cathodes made with the novel cathode material of the present invention can contain other active or inactive ingredients. Moreover, such pellets and consolidated cathodes can be treated with hydrazine or other reductant, which forms a surface coating of metallic silver.

PREFERRED EMBODIMENT

Insofar as applicants are concerned, the best mode of carrying out the process of the present invention comprises reacting powdered divalent silver oxide with about 7% by weight of finely powdered lead sulfide in the presence of 18% aqueous sodium hydroxide solution at about 80° C. for six hours; adding a small amount of cadmium sulfide (2%) to the hot solution for an additional thirty minutes (to further reduce gassing), recovering, washing and drying the solid product of the reaction mixture; and compressing the product solids into a cathode pellet made up with about 1% polytetrafluoroethylene as a lubricant.

While it is disclosed herein that, as the best mode, the inventors contemplate reacting AgO with 7% PbS, this amount of PbS has been decided upon while using an AgO synthesized at RAYOVAC Corporation. AgO from other sources, which have different characteristics, e.g., different paticle sizes, may require the use of more or less amounts of PbS to give optimum results. As a general rule, the finer the particle size of the AgO, the more PbS should be used. In like manner, those skilled in the art will appreciate that AgO powders of differing particle sizes may require reaction conditions which vary from the conditions of the bestmode contemplated by applicants.

EXPERIMENTAL RESULTS

To compare the performance of the cathodic material, and cells incorporating such cathodic material, provided by the process disclosed by the present invention, a series of tests were conducted with cells having cathodes containing divalent silver oxide plus or minus monovalent silver oxide and 1% by weight of polytetrafluoroethylene (PTFE), similar cells in which the cathode contains, instead of divalent silver oxide, the washed and dried reaction product of AgO and PbS in aqueous alkali and similar cells in which the cathodes consisted of the reaction product of AgO and other sulfide containing or lead containing materials outside the scope of the present invention.

For experimental purposes in demonstrating the advantages of the present invention, the cells employed comprised a nickel-plated cold rolled steel cathode can containing a compressed pellet of cathode material weighing about 0.2 gram with a nickel-plated cold rolled steel sleeve interposed between the can and the pellet. The anode assembly comprised a double top (Inconel ® alloy 600 outer top and a copper-plated cold rolled steel inner top welded together) unit fitted with a Nylon ® 66 grommet into which amalgamated powdered zinc with a gelling agent was placed. The cathode can and anode top are then assembled and crimped using 40% aqueous KOH plus 1% zinc oxides as the electrolyte, a fibrous cotton absorber (Webril ® ) and a grafted polyethylene barrier (Permion ® ). The cell is known as RW 47 cell which is 7.9 mm in diameter and 3.6 mm in height.

Uniformly, the reaction product of the process of the present invention was made by reacting under mixing condition 100 g of AgO (of the kind and grade used in comparative cells) in 200 cc of 18% aqueous NaOH at about 80° C. along with amounts of PbS (in weight percent of AgO) as indicated in the following tables. In the tabular presentation of test results, those tests designated by letters are not within the scope of the present invention while those tests designated by numbers are within the scope of the present invention.

Test 1

The first series of tests were conducted to determine the thermal stability and the coulomeric capacity of cathodic material of the present invention vis-a-vis other cathodic materials, such as disclosed in Cahan and Megahed I.

Table I set forth data with respect to characteristics of cells where the cathodes were made by reacting AgO with lead sulfide and other lead compounds.

TABLE I

| Test Designation | Cathode Formula % Lead Compound Reacted | Cell Expansion at 74° C. (mils) | | % Capacity Retention After 60° C. Storage | |
|---|---|---|---|---|---|
| | | 1 Week | 4 Weeks | 20 Days | 40 Days |
| A | 0% | 11.0 | 20.0 | 70 | 0 |
| 2 | 5% PbS | 3.5 | 9.0 | 71 | 19.3 |
| 3 | 7% PbS | 1.5 | 2.0 | 94 | 90.7 |
| 4 | 9% PbS | 1.0 | 2.0 | 90 | 89.5 |
| 5 | 40% PbS | 1.0 | 2.0 | 92 | — |
| B | 3% Pb | 3.0 | 18.0 | 84 | 0 |
| C | 3% PbO | 2.0 | Cell Rupture | 84 | 0 |
| D | 3% PbO$_2$ | 7.0 | Cell Rupture | 60 | 0 |

Figure 3:
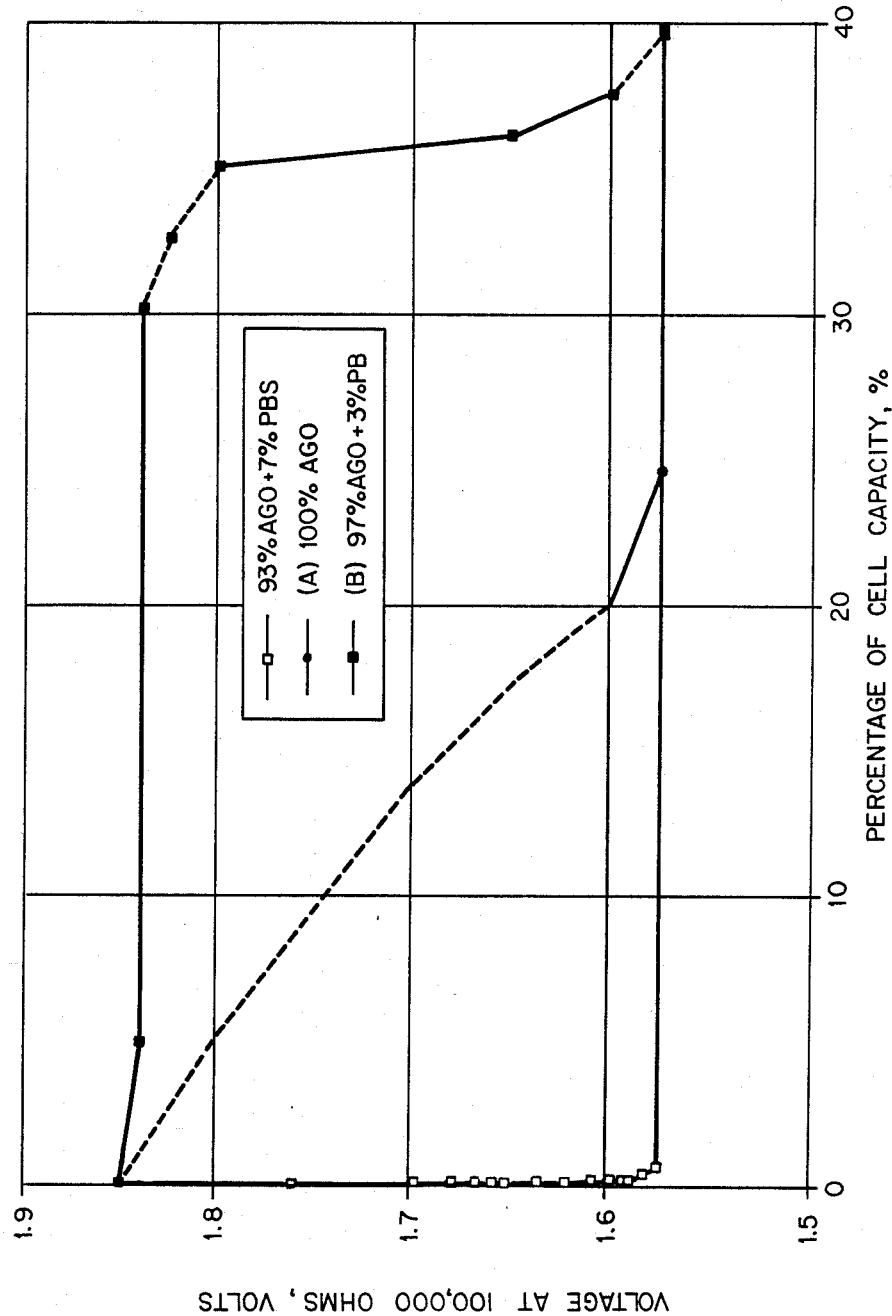
FIG. 3 depicts the constant load discharge curves of cells containing cathodic material of the present invention and similar cells containing cathodic materials of the prior art.
Figure 4:
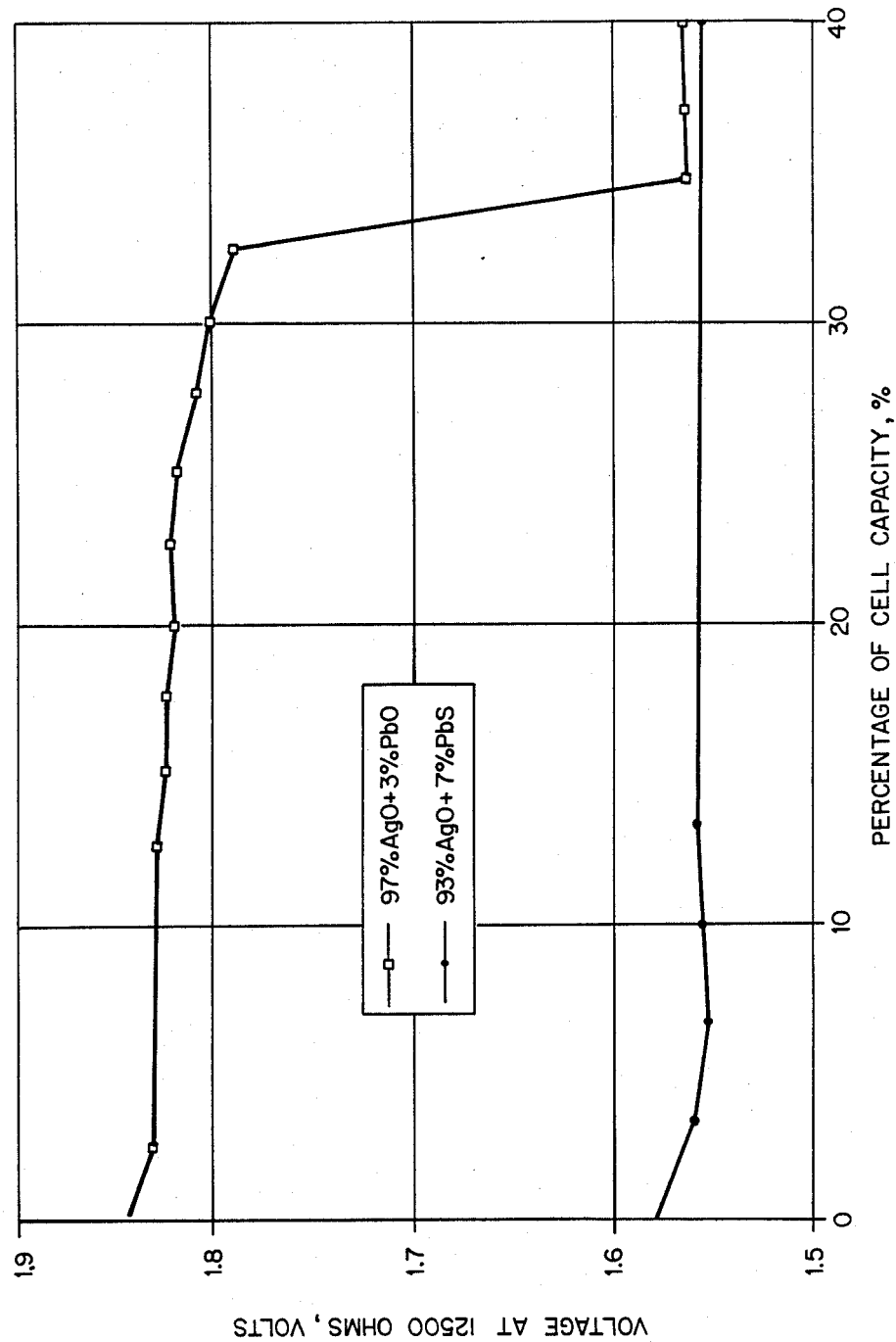
FIG. 4 depicts the constant load discharge curves of cells containing the cathodic material of the present invention and similar cells containing cathodic materials of the prior art.

Table I confirms that cells containing cathodic compositions outside the scope of the invention were unsatisfactory, particular with respect to high temperature stability, while identically constructed cells containing cathodic material of the present invention were thermally stable. In addition, FIGS. 3 and 4 shows that the cells containing cathodic materials outside of the present invention (e.g., A, B and C from Table I) exhibited two-step discharge curves under light drain conditions, while cells containing the cathodic material of the present invention (e.g., 3 from Table I) exhibited basically a one-step discharge curve.

Table II sets forth data which demonstrates the high coulometric capacity of the cathodic material, of the present invention.

TABLE II

| Test Designation | Mix | Coulometric Capacity (mAh/gm) | % Reduction From Theoretical |
|---|---|---|---|
| E | AgO Theoretical | 432 | 0 |
| F | AgO Actual[1] | 416 | 3.7 |
| G | 93% AgO + 7% PbS dry blend | 381 | 11.8 |
| 6 | 93% AgO + 7% PbS wet blend at 80° C.[3] | 346 | 19.9 |
| H | Ag$_2$O Theoretical | 232 | 0 |
| I | Ag$_2$O Actual[2] | 227 | 2.2 |
| J | 93% Ag$_2$O + 7% PbS dry blend | 211 | 9.1 |
| K | 93% Ag$_2$O + 7% PbS wet blend at 80° C.[3] | 210 | 9.5 |

[1]RAYOVAC synthesized AgO.
[2]Handy & Harmon Ag$_2$O.
[3]Wet blend prepared by the process steps of the best mode.

The data in Table II shows that while the coulometric capacity of the cathodic materials decreases significantly from the theoretical level when AgO and PbS are blended wet by 18% aqueous alkali at 80° C., the coulometric capacity is still significantly greater than the coulometric capacity of cells incorporating Ag$_2$O cathodic materials.

Test 2

In the second series of tests, a comparison of cell impedance was undertaken. Table III presents data on test samples parallel to those employed in the tests reported in Table I showing the advantage of PbS as a reactant with AgO. Table III shows the dramatic drop in pellet resistivity, at least three orders of magnitude when 3% PbS is reacted with AgO to form the active material of the cathode pellet. Table III also shows that this dramatic decrease is not unique to PbS but also occurs in tests M, N and O. However, the cells of tests M, N and O show significantly higher impedance than the cells of tests 6 through 9, which are cells of the present invention.

TABLE III

| Test Designation | Cathode Formula[1] % Lead Compound Reacted | Pellet Resistivity ohm-cm | Cell Target 0 Months at 21° C. CCV at 100 ohms (Volts) | Z (ohms) | Cell Target 3 Months at 21° C. CCV at 100 ohms (Volts) | Z (ohms) |
|---|---|---|---|---|---|---|
| L | 0% | $1.62 \times 10^4$ | 1.087 | 54.9 | 0.95 | 120.0 |
| 8 | 5% PbS | 15 | 1.627 | 8.4 | 1.37 | 8.7 |
| 9 | 7% PbS | 5 | 1.439 | 7.8 | 1.33 | 8.6 |
| 10 | 9% PbS | 5 | 1.429 | 7.6 | 1.33 | 8.5 |
| M | 3% Pb | 16 | 1.606 | 13.9 | 1.55 | 12.5 |
| N | 3% PbO | 19 | 1.620 | 11.9 | 1.53 | 12.9 |
| O | 3% PbO$_2$ | 2173 | 1.630 | 47.0 | 1.43 | 22.0 |

[1]All above mixes contained 0.5% Teflon powder for ease of pelleting.

Table IV parallels Table III in showing the effect of metal sulfides other than PbS on cathode pellet resistivity when the particular sulfides have been admixed with AgO according to the process conditions contemplated by the best mode of the present invention.

TABLE IV

| Test Designation | Cathode % Sulfide Reacted with AgO | Pellet Resistivity (ohm-cm) | Cell Target CCV at 100 ohms (Volts) | Z (ohms) |
|---|---|---|---|---|
| 11 | 5% PbS | 15 | 1.428 | 8.5 |
| P | 5% CdS | $1.2 \times 10^4$ | 1.353 | 13.5 |
| Q | 5% CaS | 6300 | 1.301 | 14.7 |
| R | 5% ZnS | $1.1 \times 10^4$ | 1.255 | 16.2 |
| S | 5% FeS | $3.9 \times 10^4$ | 1.251 | 12.3 |

The date in Table IV shows that of four non-lead containing sulfides mixed with AgO, two showed no reduction in pellet resistivity, as compared to the $1.52 \times 10^4$ ohm-centimeters of test L, one (FeS) apparently exhibited an increase in resistivity, and one (CaS) exhibited a significant decrease. However, in the case of CaS, the cell impedance was high and the closed circuit voltage under a 100 ohm load was low.

Test 3

Table V, which presents the data of test 3, demonstrates that cathodes made with the AgO-PbS reaction product of the present invention can also include other materials. While the data of Table V is limited to electrochemically active and electrochemically inactive oxides, this disclosure is not to be deemed limiting with respect to the type, character or nature of additives which can be used.

TABLE V

| Test Designation | Cathode Formula % Additive[1] | Pellet Resistivity ohm-cm | Cell Target CCV at 100 ohms | Z (ohms) |
|---|---|---|---|---|
| 12 | 2% HgO | 8 | 1.467 | 6.6 |
| 13 | 5% NiOOH | 5 | 1.376 | 7.3 |
| 14 | 5% MnO$_2$ | 6 | 1.420 | 6.3 |
| 15 | 2% CaO | 8 | 1.411 | 7.1 |
| 16 | 2% MgO | 4 | 1.421 | 6.5 |
| 17 | 0% Additive | 5 | 1.443 | 5.4 |

[1]Dry blend of additives and reaction product of AgO/7% PbS reaction in hot aqueous alkali.

The data of Table V shows that the various oxides had a negligible effect on pellet resistivity and cell impedance.

Test 4

In addition to additives or other materials such as the oxides disclosed in Table V, cathode pellets of the invention and cathode pellets of the invention consolidated in cathode cans, can also include surfaces of silver. Such silver surfaces, particularly at the surface adjacent to a separator, can be produced mechanically, e.g., by pressing a silver screen onto a consolidated cathode pellet surface or, perhaps more economically, can be produced by chemical reduction of silver oxide in the cathode material. While such chemical reduction can be accomplished by numerous water or liquid soluble reducing agents acting over a range of conditions, a most convenient reducing agent is hydrazine used as a 3% solution in methanol at ambient room temperature, i.e. (18°–23° C.). Pressed pellets containing cathode material of the present invention can be tested with such a hydrazine solution for about 1 to about 10 minutes to provide a coverage of silver on all the surfaces of the pellet. If treatment is conducted after consolidation in a cathode can, the silver surface will be essentially limited to the exposed surface of the pellet which will lie adjacent to the separator.

Table VI sets forth data with respect to pellets of cathode material within and without the invention and cells made therewith, the pellets which have been treated with hydrazine being coated with silver on all surfaces.

TABLE VI

| Test Designation | Reaction Mix Formula | Hydrazined | Cell Target CCV at 100 ohms (Volts) | Z (ohms) |
|---|---|---|---|---|
| 18 | 93% AgO, 7% PbS | No | 1.443 | 5.4 |
| 19 | 93% AgO, 7% PbS | Yes | 1.456 | 5.3 |
| T | 95% AgO, 5% CdS | Yes | 1.397 | 18.6 |
| U | 95% AgO, 5% CaS | Yes | 1.392 | 13.7 |
| V | 95% AgO, 5% ZnS | Yes | 1.346 | 13.9 |

TABLE VI-continued

| Test Designation | Reaction Mix Formula | Pellet Hydrazined | Cell Target CCV at 100 ohms (Volts) | Z (ohms) |
|---|---|---|---|---|
| W | 95% AgO, 5% FeS | Yes | 1.351 | 14.4 |

Table VII shows cell characteristics of two cells of the present invention, wherein the hydrazine treatment has been conducted on the pellet consolidated in the cathode can.

TABLE VII

| | | Cell Target | | | |
|---|---|---|---|---|---|
| | | Initial | | 3 Months at | |
| Test Designation | Cathode Treatment[1] | CCV at 100 ohms | Z (ohms) | CCV at 100 ohms | Z (ohms) |
| 20 | Non-Hydrazine | 1.571 | 10.5 | 1.303 | 10.4 |
| 21 | Consolidation Hydrazine | 1.404 | 9.4 | 1.319 | 10.0 |

[1]Cathode Formula: 97% reaction product of AgO and 7% PbS, 2% CdS and 1% Teflon.

Tables VI and VII show hydrazine treatment is adaptable to cathodes of the present invention and that cells containing such cathodes have superior characteristics, particularly cell impedances, as compared to illustrative cells outside the present invention.

Test 5

The cathode material of the present invention can be blended with monovalent $Ag_2O$. Pellet and cell characteristics where such blends are used are set forth in Table VIII, which shows increasing pellet resistivity with increasing $Ag_2O$ content but relatively little change in cell characteristics. What is not shown, of course, is the decrease in coulometric capacity which inherently occurs when divalent silver is replaced by monovalent silver.

TABLE VIII

| Test Designation | Cathode, % $Ag_2O$ Added to 7% PbS/AgO Reaction Product | Pellet Resistivity ohm-cm | Cell Target CCV (at 100 ohms) | Z |
|---|---|---|---|---|
| 22 | 0 | 5 | 1.443 | 5.4 |
| 23 | 10 | 7 | 1.458 | 5.8 |
| 24 | 20 | 15 | 1.458 | 5.7 |
| 25 | 30 | 17 | 1.459 | 5.8 |
| 26 | 40 | 35 | 1.453 | 6.1 |
| 27 | 50 | 42 | 1.442 | 6.9 |

Expected Coulometric capacities under various loads typical of types of applications for RW-42 size cells (i.e., 11.6 mm in diameter and 5.4 mm in height) using conventional zinc anodes and the best mode of the cathode of the present invention are set forth in Table IX to show the practical application of the present invention.

TABLE IX

| Application | Load (ohms) | mAh Capacity to 1.30 V | mAh to 0.90 V |
|---|---|---|---|
| Watch/calculator | 100,000 | 228 | 230 |
| Watch/calculator | 6,500 | 221 | 223 |
| Hearing Aid | 625 | 205 | 217 |
| Hearing Aid | 300 | 188 | 199 |

Except where it might be stated otherwise, all percentages set forth in this specification and the appended claims are percentages by weight. While the present invention has been disclosed as to not only its best mode but also variants thereof, it will be understood that additional variations and modifications obvious to those skilled in the art are possible. Such additional variations and modifications are considered to be within the spirit and scope of the present invention and the appended claims.

We claim:

1. A thermally stable, low-impedence-producing AgO containing cathode material which discharges at a single voltage at even low drains, which comprises AgO, $Ag_5Pb_2O_6$, $Ag_2PbO_2$ and at least (5) five percent by weight of the cathode material $Ag_2O$.

2. The AgO-containing cathode material as in claim 1, wherein said cathode material is the recovered solid product of the reaction in an aqueous alkaline medium at a temperature of at least 40° C. of powdered divalent silver oxide and between five (5) and seventeen (17) percent by weight powdered lead sulfide.

3. The AgO-containing cathode material as in claim 1, which contains any one or more cathode additives from the group consisting of $Ag_2O$, $MnO_2$, CdS, HgO, NiOOH, CaO, MgO and metallic silver.

4. The AgO-cathode material as in claim 1, in which at least 95% of the electrical capacity discharges at a single voltage at drains of one microampere per square centimeter or less.

5. The AgO-cathode material as in claim 1, in which at least 99% of the electrical capacity discharges at a single voltage at drains of one microampere per square centimeter or more.

6. A thermally stable, low-impedance electrochemical cell having an anode, an electrode, and a cathode body, wherein said cathode body comprises AgO, $Ag_5PbO_6$, $Ag_2PbO_2$, and at least five (5) percent by weight $Ag_2O$, said electrochemical cell discharges at an apparent single voltage, even at low drains.

7. The electrochemical cell as in claim 6, wherein the anode is zinc.

8. The electrochemical cell as in claim 6, wherein the electrolyte is sodium hydroxide containing or saturated with zinc oxide.

9. The electrochemical cell as in claim 6, wherein said cathode body further comprises one or more cathode additive from the group consisting of $Ag_2O$, $MnO_2$, CdS, HgO, NiOOH, CaO, MgO and metallic silver.

10. An electrochemical cell as in claim 6, wherein at low drains said cell displays a constant voltage discharge.

11. The electrochemical cell as in claim 6, in which at least 95% of the electrical capacity discharges at a single voltage at drains of one microampere per square centimeter or less.

12. The electrochemical cell as in claim 6, in which at least 99% of the electrical capacity discharges at a single voltage at drains of one microampere per square centimeter or more.

13. The electrochemical cell as in claim 6, wherein the electrolyte is potassiumhydroxide containing or saturated with zinc oxide.

14. A process for producing a thermally stable, low impedance-producing AgO-containing cathode material which discharges at an apparent single voltage at even low drains comprising:
(a) reacting together in an aqueous alkaline medium powdered divalent silver oxide and five (5) to seventeen (17) percent by weight powdered lead sulfide at a temperature between 40° C. and the boiling point of said aqueous alkaline for at least thirty minutes;

(b) recovering, as said cathode material, the solid reaction product comprising AgO, $Ag_5Pb_2O_6$, $Ag_2PbO_2$, and at least 5% by weight $Ag_2O$, from said aqueous medium; and (c) utilizing said reaction product as said cathode material.

15. The process according to claim 14, wherein the reaction temperature is between 70° C. and 90° C.

16. The process according to claim 14, wherein lead sulfide comprises 7% by weight of the silver oxide/lead sulfide admixture.

17. The process according to claim 14, wherein said reaction proceeds for six hours.

18. The process according to claim 17, wherein said process further comprises adding cadmium sulfide to said reaction for thirty minutes.

* * * * *

UNITED STATES PATENT AND TRADEMARK OFFICE
CERTIFICATE OF CORRECTION

PATENT NO. : 4,835,077
DATED : May 30, 1989
INVENTOR(S) : El-Sayed MEGAHED, et al.

Page 1 of 3

Figure 2:
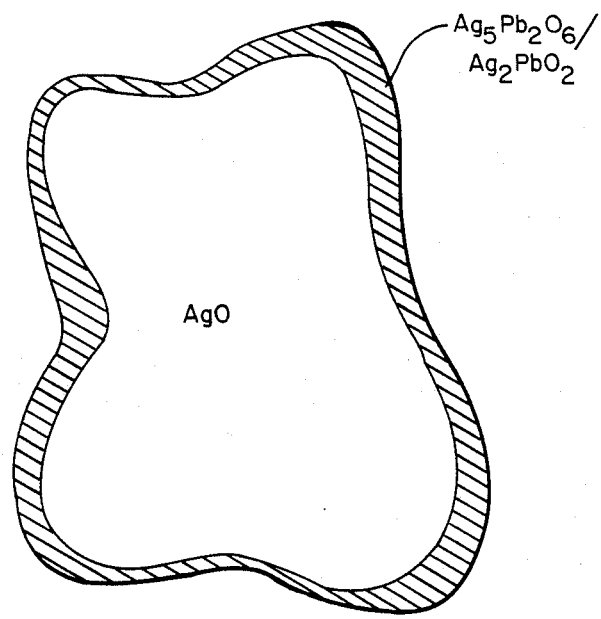
FIG. 2 is a schematic diagram of a particle of cathodic material described, in the prior art.

It is certified that error appears in the above-identified patent and that said Letters Patent is hereby corrected as shown below:

| Column | Line | |
|---|---|---|
| 1 | 51 | Please delete "Cohan" and insert --Cahan--. |
| 1 | 55 | Please delete "disclosed" and insert --discloses--. |
| 1 | 66 | Please delete "Mehahed" and insert --Megahed--. |
| 2 | 20 | Please delete "discharges" and insert --discharge--. |
| 2 | 40 | Please delete "91-04" and insert --91-104--. |
| 3 | 6 | Please delete "2" and insert --27--. |
| 5 | 2 | Please delete "FIG. 1" and insert --FIG. 2--. |
| 5 | 56 | Please delete "Pbo" and insert --PbO--. |
| 6 | 13 | Please delete "spend" and insert --spent--. |
| 6 | 33 | Please delete "Mreover" and insert -- Moreover--. |

UNITED STATES PATENT AND TRADEMARK OFFICE
CERTIFICATE OF CORRECTION

PATENT NO. : 4,835,077
DATED : May 30, 1989
INVENTOR(S) : El-Sayed MEGAHED, et al.

It is certified that error appears in the above-identified patent and that said Letters Patent is hereby corrected as shown below:

| Column | Line | |
|---|---|---|
| 6 | 40 | Please delete "formation cath-" and insert --formation of cath--- |
| 6 | 46 | Please delete "cells," and insert --cell,--. |
| 6 | 53 | Please delete "$Ag_2O$ in" and insert --$Ag_2O$--. |
| 6 | 54 | Please delete "the cathode" and insert --in the cathode--. |
| 7 | 26 | Please delete "bestmode" and insert --best mode--. |

UNITED STATES PATENT AND TRADEMARK OFFICE
CERTIFICATE OF CORRECTION

PATENT NO. : 4,835,077

DATED : May 30, 1989

INVENTOR(S) : El-Sayed MEGAHED, et al.

It is certified that error appears in the above-identified patent and that said Letters Patent is hereby corrected as shown below:

| Column | Line | |
|--------|------|---|
| 8 | 11 | Please delete "where" and insert --wherein--. |
| 8 | 34 | Please delete "shows" and insert --show--. |
| 12 | 60 | Please delete "potassiumhydroxide" and insert --potassium hydroxide--. |

Signed and Sealed this

Thirteenth Day of February, 1990

Attest:

JEFFREY M. SAMUELS

Attesting Officer     Acting Commissioner of Patents and Trademarks